(12) United States Patent
Von Varendorff et al.

(10) Patent No.: US 8,636,865 B2
(45) Date of Patent: Jan. 28, 2014

(54) METHOD OF MAKING A COMPOSITE FIBRE COMPONENT WITH THERMOPLASTIC STIFFENING ELEMENTS

(75) Inventors: Klaus Von Varendorff, Hamburg (DE); Martin Staub, Hamburg (DE); Arne Mashoff, Wrohm (DE)

(73) Assignee: Airbus Operations GmbH, Hamburg (DE)

( * ) Notice: Subject to any disclaimer, the term of this patent is extended or adjusted under 35 U.S.C. 154(b) by 667 days.

(21) Appl. No.: 12/218,985

(22) Filed: Jul. 17, 2008

(65) Prior Publication Data
US 2009/0041985 A1 Feb. 12, 2009

(30) Foreign Application Priority Data
Jul. 17, 2007 (DE) .......................... 10 2007 033 261

(51) Int. Cl.
*B29C 65/02* (2006.01)
(52) U.S. Cl.
USPC .......................................... 156/228; 156/242
(58) Field of Classification Search
None
See application file for complete search history.

(56) References Cited

U.S. PATENT DOCUMENTS 5,876,540 A * 3/1999 Pannell ........................... 156/91
5,980,665 A * 11/1999 Childress ........................ 156/92

FOREIGN PATENT DOCUMENTS

WO WO 2008007043 A1 * 1/2008

\* cited by examiner

*Primary Examiner* — Barbara J Musser
(74) *Attorney, Agent, or Firm* — Jenkins, Wilson, Taylor & Hunt, P.A.

(57) ABSTRACT

The invention relates to a method for producing a composite component reinforced by stiffening elements.

Composite component is produced by the inside gluing of a monolithic component to a multiplicity of stiffening elements by means of an adhesive suitable for this particular application. Stiffening elements are formed with a fiber reinforced, amorphous thermoplastic material. Monolithic component of composite component consists of a fiber reinforced duroplastic material—for example a composite epoxy matrix—in which are embedded, for reinforcement, carbon fibers, basalt fibers, natural fibers, ceramic fibers, Aramide® fibers, Kevlar® fibers or any combination thereof.

Monolithic component is glued to thermoplastic stiffening elements by an adhesive under the influence of pressure and temperature. Here a tolerance compensation is carried out essentially by stiffening elements, if necessary being plastically deformed, so that high dimensional stability is achieved. Composite components, which can be subject to high mechanical loads, are therefore provided, in particular, as spare or replacement parts for outer lining parts on aircraft.

The invention also relates to a composite component produced by means of a method according to the invention.

4 Claims, 3 Drawing Sheets

METHOD OF MAKING A COMPOSITE FIBRE COMPONENT WITH THERMOPLASTIC STIFFENING ELEMENTS

CROSS-REFERENCE TO RELATED APPLICATIONS

This application claims the benefit of German patent application No. 10 2007 033 261.2, filed Jul. 17, 2007, the entire disclosure of which is herein incorporated by reference.

FIELD OF THE INVENTION

The invention relates to a method for the production of a composite component reinforced with a multiplicity of stiffening elements which are formed with a fibre reinforced, gluable thermoplastic material.

The invention also relates to a composite material which is manufactured, in particular, in accordance with the method and which is formed with a monolithic component, in particular a skin panel, from a fibre reinforced duroplastic material.

BACKGROUND OF THE INVENTION

In aircraft manufacture increasing use is being made, for reasons of weight saving, of composite components which are produced with an epoxy resin composite matrix that is reinforced, in particular, with carbon fibre or glass fibre. Large sized components of composite fibre materials, for example skin panels for aerodynamic effective surface, fuselage barrels or the like, are generally additionally reinforced with stiffening profiles, for example with stringers or annular ribs. The production of stringers and skin panels in the classic CFP/GFP design is expensive because two separate structures are generally required for defining the shape of the CFP material that is initially still soft, followed as a rule by two hardening processes in the autoclave. Furthermore, lost cores of hard foam or the like have to be used in many cases for predefining the shape. These cores remain in the component after the hardening process and result in an increase in weight without performing an additional reinforcing function. Moreover, serious tolerance problems arise because two cured components have to be glued together to provide an exact fit in order to maintain a predetermined theoretical contour within the predetermined tolerances. In this procedure equalising the tolerances between the components is only possible by means of the adhesive applied in the contact area and initially still flexible.

Although an alternative method of production, in which the stringers or the skin panel have not yet fully cured when joined together, generally requires one further passage through the autoclave, it incurs an additional positioning and upgrade cost in terms of the shape defining structure in order to keep the parts to be joined together in their theoretical position within the close tolerances generally specified, and avoid any relative displacements.

SUMMARY OF THE INVENTION

An object of the invention is to provide a new method for creating composite components of fibre reinforced duroplastics additionally reinforced with stiffening elements, in which the problems occurring in the state of the art are avoided.

This object is achieved by a method with the following method steps described in claim 1:

a) production of a monolithic component, particularly a skin panel, with a fibre reinforced duroplastic material, and b) gluing of the thermoplastic stiffening elements with the cured monolithic component with an adhesive, in particular an adhesive film.

As a result of this procedure only one further passage through the autoclave is required to harden the monolithic component. The monolithic component may, for example, be a skin panel, a skin panel section, a fuselage barrel, an outer lining component for an aircraft or the like, which is initially prefabricated by a known method, for example by using, in particular, carbon fibre or glass fibre reinforced epoxy resin materials (so-called epoxy resin matrices). Alternatively the method can be used advantageously, for example, in shipbuilding in the manufacture of the hull, or in the production of rotor blades and housings for wind power plants. Other additional fields of application, in automotive engineering, for example, are also conceivable.

According to the invention the stiffening elements formed with a fibre reinforced, thermoplastic material, are glued in a second method step to the monolithic component produced from the fibre reinforced duroplastic material in the region of their contact surface (joining surface), which requires that a technical prejudice previously held, namely that a glued joint with a maximum mechanical loading capacity can only be achieved between two plastics of the same type, be overcome.

The thermoplastic material is preferably an amorphous thermoplastic material which can be glued to duroplastic materials. At least one inner tool is preferably used for the gluing process in order to achieve as accurate a positioning of the stiffening elements as possible in relation to the monolithic component. To implement the method the stiffening elements, for example in the form of prefabricated bent stringer profiles or the like, are inserted in the inner tool and an adhesive applied to the monolithic component and/or the stiffening elements in the region of a joining surface.

The monolithic component prefabricated in an upstream process step, which component is preferably formed with a fibre reinforced duroplastic material, is then placed on the inner tool, the monolithic component preferably being received in an outer tool, i.e. is previously inserted in it. The stiffening elements and the monolithic component are therefore fixedly clamped between both tools.

Because of the intrinsic weight of the outer tool and inner tool, an adequate contact pressure is generally already developed for the gluing process. To increase the contact pressure the entire structure can also be inserted in a pressing device. The inner tool and/or outer tool can be brought by means of a heating device to a setting temperature required for setting the adhesive in a range between 125° and 225°. The heating device is preferably an electrically operating resistance heater or an induction heater. Due to the preferably simultaneous use of pressure and/or temperature, the thermoplastic stiffening elements are glued to the monolithic component of duroplastic material. The gluing may alternatively also be achieved by means of the so-called "Epibond®" method and also by a cold process, at a room temperature of approx. 20° C.

In this case the theoretical contour of the finished composite component is accurately predetermined due to the already fully cured and hence rigid monolithic component. According to the invention a further tolerance compensation is possible during this gluing process because on the one hand the adhesive, for example in the form of a thin layer double-sided adhesive film or the like, is located in the contact region between the stiffening elements and the monolithic component, and on the other hand—and this represents the decisive factor—the fibre reinforced thermoplastic stiffening elements soften slightly due to temperature increased during the gluing process, and are therefore again deformable to a certain extent in a ductile manner. Because of the ductile deformability of the thermoplastic stiffening elements they are ideally placed without intervals on the shaping monolithic component and are subject to the same component deviations so that the finished composite component eventually achieves a very high dimensional stability.

Gluable, amorphous thermoplastics, e.g. polyether imide (PEI, polysulphone (PSU), polyether sulphone (PES), polyamide imide (PAI), polycarbonate (PC), acryl nitrile-butadiene-styrol (ABS), polymethyl methacrylate (PMMA), polystyrol (PS) or polyvinyl chloride (PVC)C), are particularly suitable for producing the fibre reinforced thermoplastic stiffening elements. In the list, the first-mentioned amorphous thermoplastics exhibit the highest strength, whilst the last-mentioned plastics exhibit the lowest loading capacity. The same applies to the material costs. According to the application of the finished composite component, epoxy resins, polyester resins, phenol resins or BMI resins, for example, are considered as duroplastic materials. The reinforcement of all plastic materials can be achieved, for example, with carbon fibres, glass fibres, Aramide® fibres, Kevlar® fibres, ceramic fibres, basalt fibres, natural fibres or a combination thereof.

In the case of a monolithic component which has a carbon fibre reinforced epoxy resin composite matrix, it has been found that the adhesive film Cytec Fiberite® FM300 M.03—which is supplied by the manufacturer to smooth FRP (fibre reinforced plastic) surfaces—is ideal for gluing fibre reinforced epoxy resin components to amorphous thermoplastics.

The method therefore allows the production of high strength, and at the same time dimensionally stable composite components by gluing a monolithic component, formed with fibre reinforced duroplastics, particularly a carbon fibre reinforced epoxy resin, to fibre reinforced thermoplastic stiffening elements, particularly in the form of stiffening plastics.

Because of the high dimensional stability and production precision of the manufactured composite components that can be achieved by the inventive method, these components can be used, for example, as replacement parts for highly stressed lining panels on aerodynamic effective surfaces of aircraft. These lining panels must, in addition to having good dimensional stability essential for replaceability and optimum aerodynamic properties, also be capable of absorbing high mechanical loads in order to be able reliably to resist the particular loads of everyday flight operation, e.g. hail or bird strike.

Moreover, additional hard foam cores are no longer required for supporting the structure when lining the thermoplastic stiffening elements with the monolithic skin panel, thereby reducing the production cost.

An object of the invention is also achieved by a composite component according to claim 9.

Because the monolithic component can be glued to a multiplicity of stiffening elements of a thermoplastic fibre reinforced plastic material, the composite component exhibits excellent dimensional stability compared to conventional composite components which are produced entirely of fibre reinforced duroplastic materials.

Moreover, this results in an extremely simplified production process, and the finished composite component itself is subject to only a very small fault rate (air inclusions, local delaminations, fluctuations in material thickness, local variation in fibre volume proportion, etc.), because of the prefabrication of the monolithic component, thereby considerably reducing the reject rate.

At the same time high mechanical loading capacity and long life are achieved by the combination of a monolithic component, which is preferably formed with a carbon fibre reinforced epoxy resin, with the glued stiffening elements, which are preferably formed with an amorphous thermoplastic and at the same time fibre reinforced plastic.

The monolithic component, which may, for example, be a skin panel for a fuselage cell, a partial region of a skin panel, an outer lining part for an aircraft or the like, will often have a geometric shape other than a flat surface, and may be bent in up to two directions of the space. In addition, the monolithic component may, in certain regions throughout the extent of its surface, have different material thicknesses, cross-sectional allowances, beads, reinforcing zones and the like. The same applies to the stiffening elements, which are generally designed as bent stiffening profiles.

The stiffening profiles may have almost any cross-sectional geometry. For example, the stiffening profiles may have a rectangular, square, trapezoid, L-shaped, h-shaped, H-shaped, S-shaped and Ω-shaped cross-sectional geometry or any other cross-sectional geometries. Different cross-sectional geometries are possible in certain sections. The inventive composite component is preferably used as a lining part that can easily be replaced in the case of wear in the region of front edges on aerodynamic effective surfaces of aircraft, particularly in the region of the leading edge of the lateral tail units of the aircraft. If the composite component is a skin panel or a lining panel for the leading edge of a lateral tail unit of an aircraft, the stiffening elements are generally formed as so-called "stringers" or "stringer profiles".

With regard to the materials used for the monolithic component and for the stiffening elements (duroplastic/thermoplastic), reference is made to the statements made above as part of the more detailed description of claim 1.

Further advantageous embodiments of the method and inventive composite component are explained in the claims below.

DETAILED DESCRIPTION OF THE DRAWINGS

Figure 1:
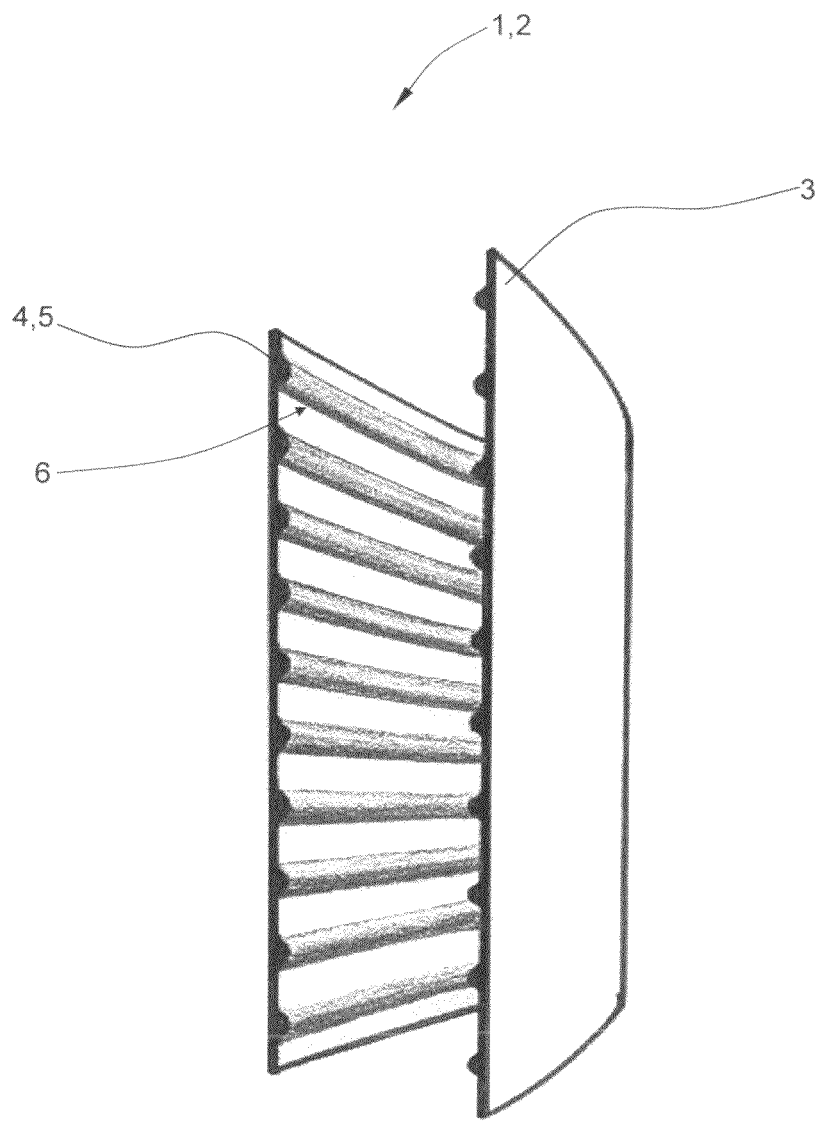
FIG. 1 shows a perspective inner view of a composite component reinforced with thermoplastic stiffening elements.
Figure 2:
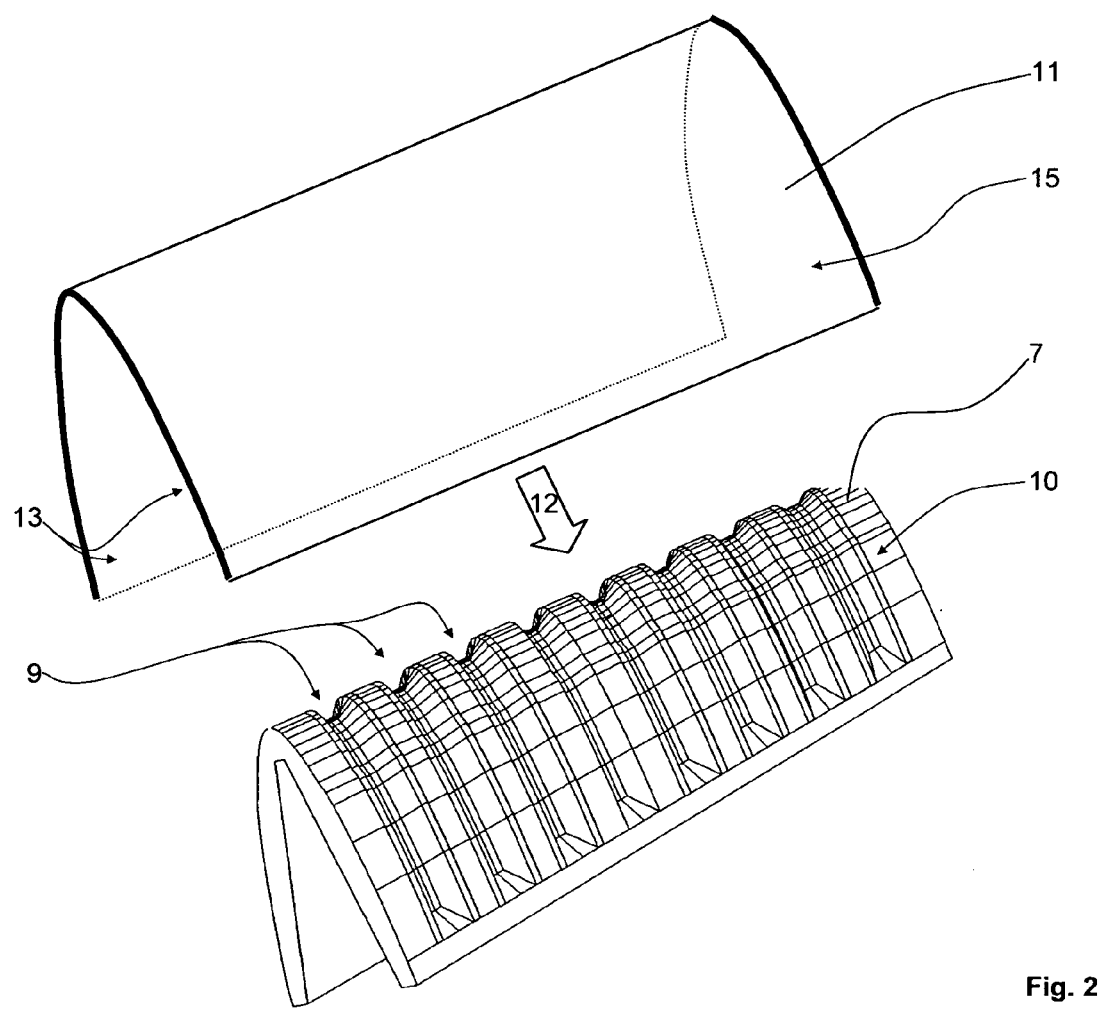
FIG. 2 shows a perspective view of an inner tool for producing the composite component according to FIG. 1 with a monolithic component.

To explain the inventive method and a composite component produced according to the method, reference is made simultaneously to FIGS. 1 and 2.

FIG. 1 shows a finished composite component 1, which in the exemplary embodiment shown is designed as a so-called "nose part 2" or (outer) lining part in the region of a leading edge of a lateral tail unit of an aircraft. Composite component 1 may also be a skin panel of an aerodynamic effective surface of a vehicle, a region of such a skin panel or a complete fuselage barrel.

Composite component 1 comprises, among other things, a monolithic component 3, on the inside of which is glued a multiplicity of stiffening elements, only the upper stiffening element of which bears reference number 4. Monolithic component 3 is preferably formed integrally with a carbon fibre reinforced epoxy resin. Other resin systems and alternative fibre reinforcements may also be used. Monolithic component 3 may, in certain regions, have thickenings, cross-sectional allowances or different material thicknesses.

Stiffening element 4 and the other stiffening elements not provided with reference numbers are designed, in the exemplary embodiment shown in FIG. 1, as a peripheral, rib-type stiffening profile 5, which is glued on the inside to monolithic component 3. Stiffening profile 5 has an essentially trapezoidal cross-sectional geometry. If the radius of curvature of monolithic component 3 is too small, the stiffening profiles are not of a peripheral design but bear against the legs of component 3 on both sides and not in the region of curvature.

Stiffening profile 5 is formed according to the invention with an amorphous, fibre reinforced thermoplastic material.

Thermoplastic stiffening profile 5 is fixedly glued by means of adhesive 6 to monolithic component 3, which is formed with a fibre reinforced duroplastic. Adhesive films, adhesive strips, adhesive tapes, pasty adhesives or adhesives with a low viscous consistency, for example, can be used ad adhesive 6. If monolithic component 3 is produced with a carbon fibre reinforced epoxy resin system (composite epoxy matrix), for example, the adhesive film "Cytec Fiberite® FM300 M.03" may be used, for example, as adhesive 6. This adhesive film has a weight per unit area of approximately 150 g/m² and sets at a temperature of approximately 180° C. Monolithic components 3, which are formed with other duroplastic resin systems and/or fibre reinforcements, sometimes require the use of alternative adhesives for the mechanically optimum joining of thermoplastic stiffening elements 4.

Due to the rib-type stiffening profiles 5 glued on the inside of monolithic component 3, composite component 1 attains high strength values which enable it to be used, for example, as a nose part 2 in the region of a highly loaded leading edge of the lateral tail unit of an aircraft.

Since stiffening profiles 5 are formed with an amorphous, fibre reinforced thermoplastic, an compensation of relatively high tolerance deviations are possible when stiffening profiles 5 are glued to monolithic component 3 consisting of a carbon fibre reinforced epoxy resin, for example. Therefore composite component 1 may be used as a spare or replacement part for outer lining parts on aircraft.

The tolerance compensation is achieved for the most part by the ductile deformability of stiffening profiles 5 due to the temperatures of 125° C. to 225° C. preferably prevailing during gluing and the consequent, at least partial softening of thermoplastic stiffening profiles 5. On the other hand, adhesive 6 in the contact region between stiffening profiles 5 and monolithic component 3 only allows a supplementary compensation of relatively small tolerance deviations between the components. Due to the ductile deformability of thermoplastic stiffening profiles 5 a contact of stiffening elements 4 against monolithic component 3, without intervals, i.e. full surface contact, is simultaneously achieved.

Figure 3:
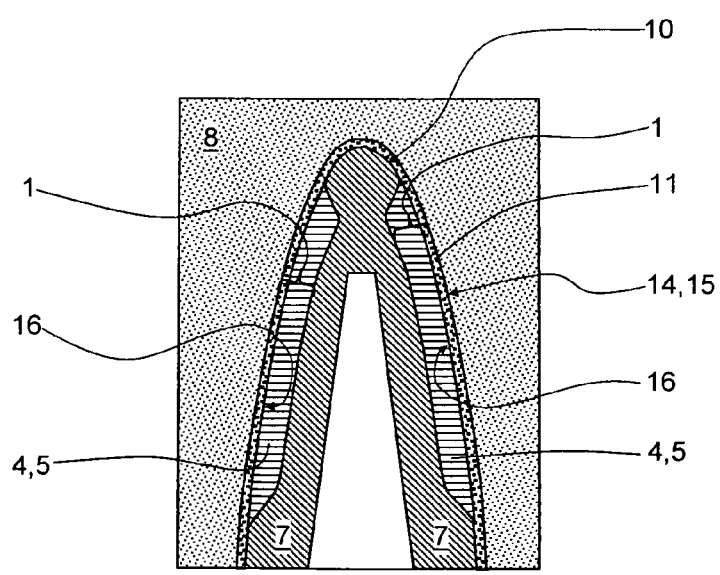
FIG. 3 shows a cross-sectional representation through the composite component arranged between the inner tool and an optional outer tool.

An inner tool 7 and an outer tool 8, as shown in FIGS. 2, 3, are preferably used for carrying out the method according to the invention.

Inner tool 7 has at, at least in certain regions, a multiplicity of rib-type recesses 9 or beads into which are inserted the stiffening elements to be glued. A cross-sectional geometry of recess 9 corresponds essentially to a cross-sectional geometry of the stiffening elements to be inserted (cf. FIG. 1). Only recess 9 is provided with a reference number to represent the other correspondingly designed recesses. The surface geometry of an outer surface 10 of inner tool 7 predetermines the inner theoretical geometry of composite component 1 to be produced. After the stiffening elements have been inserted in recess 9 and all the other recesses, a prefabricated, and already fully cured monolithic component 11 is placed on inner tool 7 in the direction of arrow 12. An inner surface 13 of monolithic component 11 corresponds as accurately as possible to the design of the surface geometry of outer surface 10 of inner tool 7. The stiffening elements can already be provided with adhesive 6 before being inserted in the recesses. Alternatively it is possible not to apply adhesive 6 until the stiffening elements have been inserted in inner tool 7. Finally monolithic component 11 is loaded in the direction of arrow 12 with sufficient contact pressure in order to complete the gluing of the stiffening elements to monolithic component 11. To increase the contact pressure and improve the dimensional stability of the finished composite component 1, outer tool 8 (cf. in particular FIG. 3) is preferably used to clamp or fix the position of monolithic component 11, i.e. is "folded" over monolithic component 11. An inner surface 14 of outer tool 8 forms an outer surface 15 of monolithic component 11 and bears against it almost over its full surface ideally. Due to the intrinsic weight of outer tool 8, an adequate contact pressure against stiffening elements 4 or stiffening profiles 5 received between tools 7, 8 and monolithic component 11 is generally already achieved. This generally ensures a suitably high contact pressure in the region of a joining surface 16, i.e. the contact surface (gluing surface) between stiffening elements 4 or stiffening profiles 5 and monolithic component 11. Moreover, inner tool 7 and outer tool 8 can be pressed against each other by means of a device not shown in the drawing.

For the gluing process it is generally necessary to heat inner tool 7 and/or outer tool 8 to the required setting temperature of adhesive 6 by means of heating devices not shown in FIG. 2 and preferably electrically and/or inductively operated. Alternatively, however, cold gluing can be carried out at room temperature (approx 20° C.) by means of the so-called "Epibond®" process.

Figure 4:
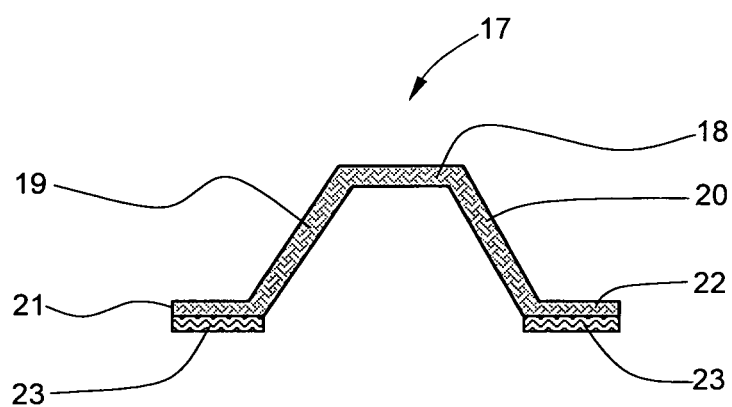
FIG. 4 shows a highly schematised explanatory representation through an exemplary stiffening profile.

FIG. 4 shows a highly schematised cross-section through an exemplary stiffening profile with an essentially trapezoid cross-sectional geometry Stiffening profile 17 formed with an amorphous thermoplastic and fibre reinforced plastic material has a horizontally running connecting bridge 18 and two legs 19, 20 running on both sides of it in an obliquely downward direction, to which legs an essentially horizontal fastening flange 21, 22 connects. An adhesive 23 (adhesive film, glue, adhesive film, adhesive tape, double adhesive tape, prepreg material, etc.) is applied to fastening flanges 21, 22 to achieve maximum adhesion to monolithic component 11. Both fastening flanges 21, 22 form the contact region in which the inside gluing of each of the stiffening elements to the inner surface 13 of monolithic component 11 takes place (cf. FIG. 2).

What is claimed is:

1. A method for producing a composite component reinforced with a multiplicity of stiffening elements, wherein the stiffening elements are formed with a fibre reinforced, gluable thermoplastic material, comprising the following steps:
producing a fully cured monolithic component having a fibre reinforced duroplastic material;
producing thermoplastic stiffening elements;
providing an inner tool, wherein the inner tool is a single piece and comprises at least in one region a multiplicity of rib-type recesses or beads which are adapted to receive the stiffening elements, wherein a cross-sectional geometry of the rib-type recesses or beads corresponds to a cross-sectional geometry of the stiffening elements to be inserted, and wherein surface geometry of an outer surface of the inner tool predetermines the inner theoretical geometry of the composite component to be produced;

providing an outer tool, wherein the outer tool is adapted to receive the fully cured monolithic component and wherein the outer tool comprises an inner surface which forms an outer surface of the monolithic component;

inserting the stiffening elements in the corresponding recesses of the inner tool;

placing the fully cured monolithic component on the inner tool;

inserting the fully cured monolithic component in the outer tool to increase pressing pressure and dimensional stability; and gluing the thermoplastic stiffening elements to the fully cured monolithic component with an adhesive;

wherein the inner tool and/or the outer tool are heated to a temperature of between 125° C. to 225° C. to cure the adhesive, wherein the inner tool and the outer tool are loaded with pressure when the inner tool and the outer tool are pressed against each other during gluing of the stiffening elements, and wherein a tolerance compensation takes place between the stiffening elements and the shape-defining fully cured monolithic component.

2. The method according to claim 1, wherein rib-type stiffening profiles which have an essentially trapezoidal cross-sectional geometry are glued to the fully cured monolithic component as stiffening elements in the region of a joining surface.

3. The method according to claim 1, wherein an adhesive film, an adhesive strip, and adhesive tape, a pasty adhesive, or an adhesive with a low viscous consistency is used as adhesive for gluing the stiffening elements to the fully cured monolithic component having a carbon fibre reinforced epoxy resin.

4. The method according to claim 1, wherein the adhesive is an adhesive film, a glue, an adhesive tape, a double adhesive tape, a prepreg material, an adhesive strip, a pasty adhesive or an adhesive with a low viscous consistency.

* * * * *